(12) United States Patent
Tsenkova (10) Patent No.: US 11,828,654 B2
(45) Date of Patent: Nov. 28, 2023

(54) SPECTROSCOPIC ANALYZER AND SPECTROSCOPIC ANALYSIS METHOD

(71) Applicant: Roumiana Tsenkova, Kobe (JP)

(72) Inventor: Roumiana Tsenkova, Kobe (JP)

( * ) Notice: Subject to any disclaimer, the term of this patent is extended or adjusted under 35 U.S.C. 154(b) by 0 days.

(21) Appl. No.: 17/761,517

(22) PCT Filed: Sep. 18, 2019

(86) PCT No.: PCT/JP2019/036447
§ 371 (c)(1),
(2) Date: Mar. 17, 2022

(87) PCT Pub. No.: WO2021/053737
PCT Pub. Date: Mar. 25, 2021

(65) Prior Publication Data
US 2022/0364920 A1 Nov. 17, 2022

(51) Int. Cl.
*G01J 3/42* (2006.01)
*G01N 21/359* (2014.01)
*G01J 3/02* (2006.01)

(52) U.S. Cl.
CPC .............. *G01J 3/42* (2013.01); *G01N 21/359* (2013.01); *G01J 3/02* (2013.01)

(58) Field of Classification Search
CPC .......... G01J 3/42; G01J 3/02; G01J 2003/102; G01J 3/10; G01J 3/108; G01J 3/28;
(Continued)

(56) References Cited

U.S. PATENT DOCUMENTS

| 2007/0211247 A1 | 9/2007 | Tsenkova |
| 2008/0113337 A1* | 5/2008 | Sakudo ................. G01N 21/31 435/5 |
| 2019/0154568 A1 | 5/2019 | Shim et al. |

FOREIGN PATENT DOCUMENTS

| JP | 2003011429 A | 1/2003 |
| JP | 2005050176 A1 | 6/2007 |

(Continued)

OTHER PUBLICATIONS

International Searching Authority, "International Search Report" PCT/JPN2019/036447, dated Oct. 28, 2019, pp. 1-2.
(Continued)

*Primary Examiner* — Md M Rahman
(74) *Attorney, Agent, or Firm* — Kunzler Bean & Adamson; Michael L. Bartholomew (57) ABSTRACT

A spectroscopic analyzer includes: an irradiator that irradiates a target measurement object with lights of a plurality of different wavelengths sequentially as a pre-irradiation, and, after the pre-irradiation, further irradiates the target measurement object with lights of a plurality of different wavelengths sequentially as a measurement-irradiation; a detector that, during the measurement-irradiation, detects reflected light, transmitted light, or a transmitted reflected light from the target measurement object at each of the plurality of different wavelengths of the measurement-irradiation and that outputs absorbance spectral data; a data analyzer that analyzes the absorbance spectral data; and a result display that displays analysis results related to components of the target measurement object.

8 Claims, 10 Drawing Sheets

(58) Field of Classification Search
CPC ......... G01N 21/359; G01N 2021/1725; G01N 21/31; G01N 2201/0627
USPC ....................................................... 356/326
See application file for complete search history.

(56) References Cited

FOREIGN PATENT DOCUMENTS

| | | | |
|---|---|---|---|
| JP | 2012237834 A | | 12/2012 |
| JP | 2013228261 A | | 11/2013 |
| JP | 2018205084 A | * | 12/2018 |

OTHER PUBLICATIONS

Zoltan Kovacs, et al., "Water Spectral Patterns Reveals Similarities and Differences in Rice Germination and Induced Degenerated Callus Development," Plants 2021, 10, 1832, MDPI, Sep. 3, 2021, pp. 1-20.

Goto, N et al., "Detection of UV-induced cyclobutane pyrimidine dimers by near-infrared spectroscopy and aquaphotomics," Sci. Rep. 5, 11808; doi: 10.1038/srep11808 (2015), Jul. 2, 2015, pp. 1-13.

Dusan Koji, et al., "Self-subtraction improves consistency in spectral curve fitting," Journal of Quantitative Spectroscopy & Radiative Transfer 277 (2022) 107991, Jul. 26, 2021, pp. 1-11.

Eri Chatani, et al., "Water Molecular System Dynamics Associated with Amyloidogenic Nucleation as Revealed by Real Time Near Infrared Spectroscopy and Aquaphotomics," Jul. 11, 2014 | vol. 9 | Issue 7 | e101997, Plos One, pp. 1-10.

* cited by examiner

Transmitted-reflected Light Detection

Fig. 6C

Determination Coefficients of
Raw Milk Freshness Prediction (Time) (1)

Fig. 7

Determination Coefficients of
Raw Milk Freshness Prediction (Time) (2)

SPECTROSCOPIC ANALYZER AND SPECTROSCOPIC ANALYSIS METHOD

CROSS-REFERENCE TO RELATED APPLICATIONS

The present application is a continuation of and claims benefit under 35 U.S.C. § 120 to International Application No. PCT/JP2019/036447 filed on Sep. 18, 2019, the entire contents of which are incorporated herein by reference.

TECHNICAL FIELD

The present invention relates to a spectroscopic analyzer and a spectroscopic analysis method for measuring the concentration, discrimination, and characteristic of a component in a sample by using light. Specifically, the present invention relates to a measurement of the concentration and discrimination of each component and the characteristics of each sample by spectral analyses or multivariate analyses of the obtained absorption spectrum.

BACKGROUND ART

Since visible light and near-infrared light have lower energy than ultraviolet light, the sample is less likely to be damaged by the irradiation of ultraviolet light etc. Therefore, in recent years, component analysis particularly using near-infrared light has been performed in various fields. For example, a specific component has been quantitatively analyzed by irradiating near-infrared light to the target measurement object to measure the absorption wavelength derived from the specific component or the absorbance in its wavelength region.

Further, the discrimination of components in a sample and the measurement of the characteristics of the components have been conducted by the spectral analyses or the multivariate analyses of the absorption spectrum obtained from the measurement of the absorption spectrum in a specific wavelength region.

Japanese Patent No. 4710012 discloses a visible light/near-infrared spectroscopic analysis method build a model for discriminating each component and/or measuring the characteristics of the component by performing a spectral analysis or a multivariate analysis after performing a spectral measurement while applying a perturbation by adding a predetermined condition to a sample.

SUMMARY

The method according to Patent Document 1 is useful but still requires lots of knowledge and experience to perform appropriate analysis.

A spectroscopic analyzer of the present disclosure includes an irradiator that irradiates a target measurement object with lights of a plurality of different wavelengths sequentially as a pre-irradiation, and, after the pre-irradiation, further irradiates the target measurement object with lights of a plurality of different wavelengths sequentially as a measurement-irradiation; a detector that, during the measurement-irradiation, detects reflected light, transmitted light, or a transmitted reflected light from the target measurement object at each of the plurality of different wavelengths of the measurement-irradiation and that outputs absorbance spectral data; a data analyzer that analyzes by applying an analysis model to the absorbance spectral data; a result display that displays the analysis results related to components of the target measurement object.

The plurality of different wavelengths in the pre-irradiation and the plurality of different wavelengths in the measurement-irradiation may be determined based on wavelengths that the analysis requires.

The plurality of different wavelengths in the pre-irradiation and the plurality of different wavelengths in the measurement-irradiation may be the same.

The irradiator sequentially may irradiate the plurality of different wavelengths in the measurement-irradiation from a short wavelength side to a long wavelength side when the plurality of different wavelengths in the pre-irradiation are sequentially irradiated from a long wavelength side to a short wavelength side, or the irradiator sequentially may irradiate the plurality of different wavelengths in the measurement-irradiation from a short wavelength side to a long wavelength side when the plurality of different wavelengths in the pre-irradiation are sequentially irradiated from a long wavelength side to a short wavelength side.

The plurality of different wavelengths in the pre-irradiation may be sequentially irradiated from a short wavelength side to a long wavelength side.

The plurality of different wavelengths in the pre-irradiation are sequentially irradiated from a long wavelength side to a short wavelength side.

Both the plurality of different wavelengths in the pre-irradiation and the plurality of different wavelengths in the measurement-irradiation may be within a range between 660 nm and 970 nm.

A spectroscopic method of the present disclosure includes irradiating a target measurement object with lights of a plurality of different wavelengths sequentially as a pre-irradiation, further irradiating, after the pre-irradiation, the target measurement object with lights of a plurality of different wavelengths sequentially as a measurement-irradiation; detecting, during the measurement-irradiation, reflected light, transmitted light, or a transmitted reflected light from the target measurement object at each of the plurality of different wavelengths of the measurement-irradiation and outputting absorbance spectral data; analyzing by applying an analysis model to the absorbance spectral data; displaying the analysis results related to components of the target measurement object.

The invention of a visible/near-infrared spectroscopic analyzer that may irradiate with a light having a wavelength in a range of 400 nm to 2500 nm or a part of the range from an irradiation unit to a target measurement object, detects reflected light, transmitted light or transmitted-reflected light, obtains spectral data, and analyzes quantitatively or qualitatively components and/or component concentrations in the target measurement object by analyzing an absorbance of all wavelengths or specific wavelengths of the spectral data using an analysis model created in advance, wherein the irradiation part includes: a plurality of light sources that irradiate light of a single wavelength; a lighting means that is linked to each of the plurality of light source and lights each of the plurality of light source; a light source selection means for selecting a light source to irradiate light from the plurality of light sources at a time of measurement; a lighting control means that is linked to the lighting means and the light source selection means and controls the selected light source independently for each light source so as to light the selected light source in a predetermined irradiation order for a predetermined irradiation duration.

In this way, the irradiation unit includes a plurality of light sources that can independently control lighting (irradiation)

and irradiate light of a single wavelength. The wavelength of the light, the order of the irradiation and the number of the irradiations can be easily set arbitrarily at the time of the measurement. Therefore, when the perturbation is applied as a pretreatment, the wavelength of the light, the order of the irradiation, and the number of the irradiations are appropriately changed to obtain the optimum conditions (the wavelength of the light, the order of the irradiation, and the number of the irradiations) to obtain high analysis accuracy. Therefore, since the perturbations can be applied under optimum conditions, the analysis accuracy can be improved.

In this case, the visible/near-infrared spectroscopic analyzer may further include an irradiation timing setting means for setting an irradiation timing of the selected light source at the time of measurement; and an irradiation duration setting means for setting an irradiation duration of the selected light source at the time of measurement; wherein the lighting control means controls the selected lighting means and lights the selected light source at the irradiation timing for the irradiation duration.

In this case, the visible/near-infrared spectroscopic analyzer may further include a brightness setting means for setting brightness of the selected light source.

The invention of a visible/near-infrared spectroscopic analyzer that may irradiate with a light having a wavelength in a range of 400 nm to 2500 nm or a part of the range from an irradiation unit to a target measurement object, detects reflected light, transmitted light or transmitted-reflected light, obtains absorbance spectral data, and analyzes quantitatively or qualitatively components and/or component concentrations in the target measurement object by analyzing an absorbance of all wavelengths or specific wavelengths of the absorbance spectral data using an analysis model created in advance, wherein the irradiation part includes: a plurality of light sources that irradiates light of a single wavelength; a shutter opening/closing means that includes a shutter and passes or blocks light from each of the plurality of light sources to the target measurement object by the shutter; a control means that is linked to the shutter opening/closing means and independently controls a timing for passing/blocking light from each of the light sources and an irradiation duration.

In this case, the control means may include: a light source selection means for selecting a light source of light to be applied to the target measurement object among lights from the plurality of light sources at a time of measurement; a shutter opening/closing control means that receives a signal from the light source selection means at the time of measurement and controls irradiation of light from the selected light source.

In this case, the control means may further include an order setting means for setting an irradiation order of the selected light source at the time of measurement; wherein the shutter control means receives signals from the light source selection means and the order setting means, and opens and closes the shutter of the selected light source in the set irradiation order.

The invention of a visible/near-infrared spectroscopic analysis method may include: irradiating with a light having a wavelength in a range of 400 nm to 2500 nm or a part of the range from an irradiation unit to water, an aqueous solution, a living body, or a sample derived from the living body related to a target measurement object including water; detecting reflected light, transmitted light or transmitted-reflected light; obtaining absorbance spectral data of the water; and analyzing quantitatively or qualitatively the time change and aging of the sample components and/or component concentrations in the sample by analyzing an absorbance of all wavelengths or specific wavelengths of the absorbance spectral data using an analysis model created in advance.

The visible/near-infrared spectroscopic analysis method may include performing a spectral measurement while a perturbation is applied by irradiating a sample containing water related to the target measurement object with light before the measurement.

The visible/near-infrared spectroscopic analysis method may use the visible/near-infrared spectroscopic analyzer according to either one of the above visible/near-infrared spectroscopic analyzer.

The above visible/near-infrared spectroscopic analyzer or the above visible/near-infrared spectroscopic analysis method enables to analyze more easily and more efficiently the components and/or component concentrations of the measurement target with high accuracy.

DETAILED DESCRIPTION

Hereinafter, an embodiment of a visible/near-infrared spectroscopic analyzer and a visible/near-infrared spectroscopic analyzing method will be described as an example in the case of predicting the freshness of raw milk with reference to the drawings. The present invention is not limited to this embodiment.

1. Specific Configuration

The visible/near-infrared spectroscopic analyzer 1 irradiates a target measurement object (for example, raw milk) with the light having a wavelength in the range of 400 nm to 2500 nm or a part of the range (for example, 600 to 1000 nm). After detecting and obtaining the absorbance spectral data of the reflected light, the transmitted light or the transmitted-reflected light of the target measurement object, the absorbance at all the measured wavelengths or the specific wavelengths in the absorbance spectral data is analyzed using an analysis model prepared in advance, and qualitative or quantitative analysis of the components or the concentration of the components in the target measurement object is performed.

Figure 1:
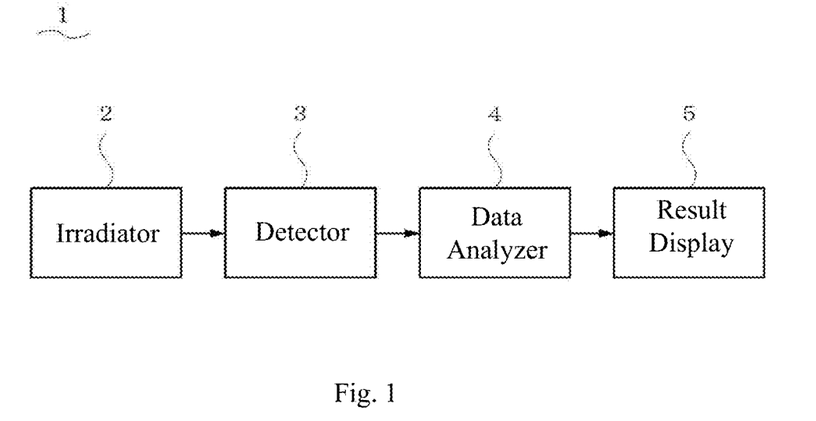
FIG. 1 is a block diagram showing a schematic configuration of a visible/near-infrared spectroscopic analyzer according to an embodiment.

As shown in FIG. 1, the visible/near-infrared spectroscopic analyzer 1 includes four elements: an irradiation unit (or irradiator) 2, a detection unit (or detector) 3, a data analysis unit (or data analyzer) 4, and a result display unit (or result display) 5. As the wavelength range of light, after creating the analysis model, one or a plurality of wavelengths, including wavelength light necessary for prediction in the case of using the analysis model, can be selected. Hereinafter, each element will be described.

(1-1) Irradiation Unit

Figure 2:
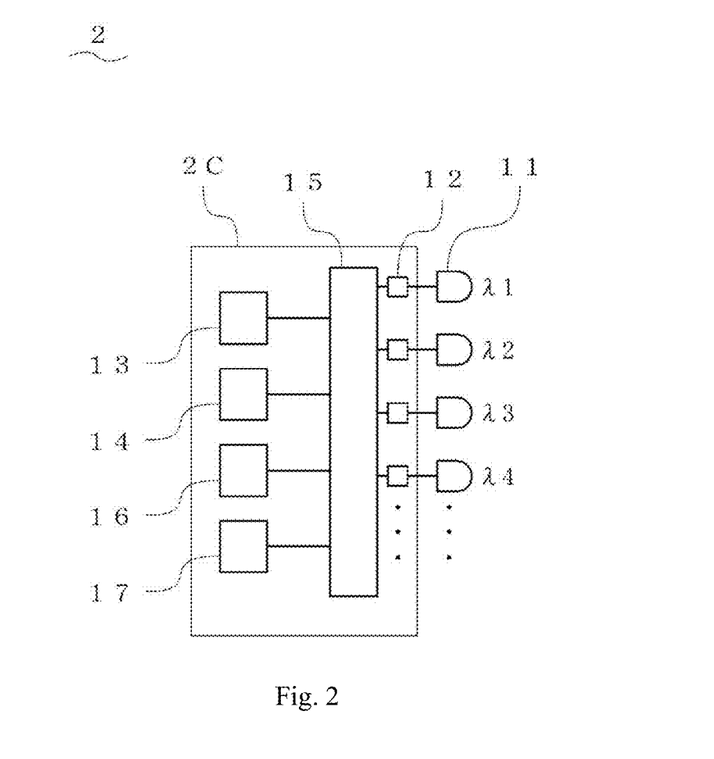
FIG. 2 is a diagram showing a configuration of an irradiation unit in the above analyzer.

As shown in FIG. 2, the irradiation unit 2 includes a plurality of light sources 11 such as LEDs that irradiate light having a single wavelength and being different from each other, a lighting means 12 that is connected to each light source 11 and lights each light source 11, a light source selection means 13 that selects one or more of the plurality of light sources 11 to irradiate light from the plurality of light sources 11 at the time of measurement, an irradiation timing setting means 14 that sets an irradiation timing of the selected light source at the time of the measurement, a lighting control means 15 independently controlling each of the plurality of light sources 11 so as to turn on the selected one or more of the plurality of light sources 11 at a predetermined irradiation timing for a predetermined irradiation period by controlling the lighting means 12 at the time of the measurement after receiving a signal from a light source selection means 13 and an irradiation timing setting means 14. Therefore, a plurality of types of light having a single wavelength and being different from each other are irradiated from the irradiation unit 2.

Further, the irradiation duration setting means 16 for setting the irradiation duration of the light source 11 selected by the light source selection means 13 at the time of measurement can be provided. The irradiation duration setting means 16 can change the time for continuing the irradiation of the light source 11.

Further, the luminance setting means 17 for setting the luminance of the selected light source can be provided. The luminance setting means 17 can change the luminance of one or more of the plurality of the light sources 11.

Figure 3:
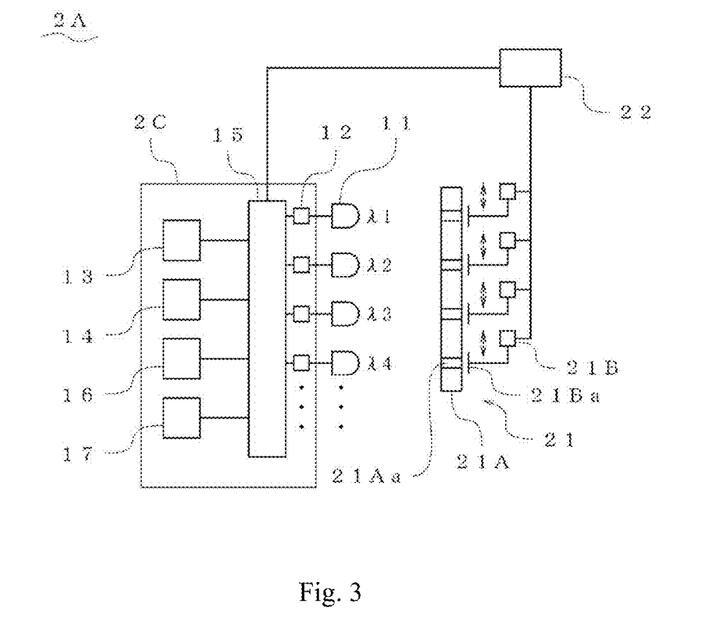
FIG. 3 is a diagram showing another configuration of an irradiation unit in the above analyzer.

Further, when the plurality of the light sources 11 is unstable at the beginning of lighting and stabilizes after being lit for a certain period of time, e.g. halogen lamps, the irradiation unit 2A can be configured as shown in FIG. 3. In this case, the irradiation unit 2A includes a shutter opening/closing control means 22 for controlling the shutter means 21 for passing/blocking the light of each of the plurality of the light sources 11. The lighting control means 15 controls the timing of passing/blocking the light from each of the plurality of the light sources 11 independently by controlling the shutter opening/closing control means 22.

The shutter means 21 has an opening member 21A having a plurality of openings 21A$a$ for passing the light of each of the plurality of the light sources 11, and a shutter opening/closing means 21B linked to the shutter opening/closing control means 22 and opening/closing the plurality of openings 21A$a$ by a shutter 21B$a$.

Figure 4:
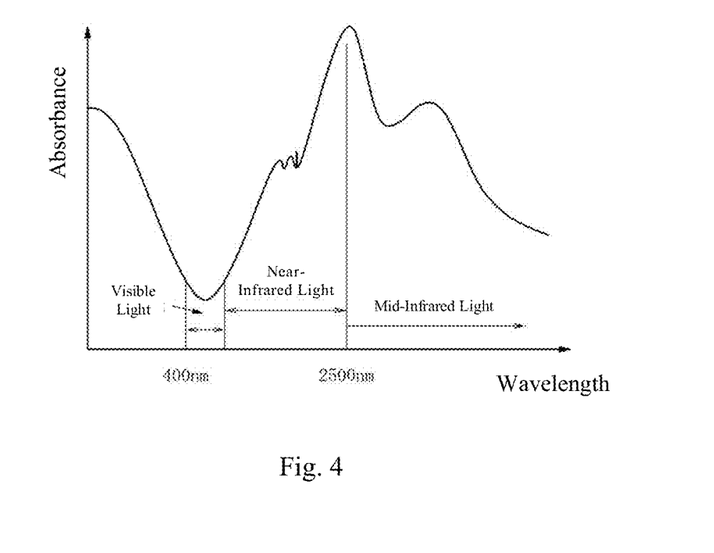
FIG. 4 is a diagram showing the absorption characteristics of water.

FIG. 4 shows the relationship between the wavelength and the absorbance related to water. Since the absorbance of water itself is utilized at the visible/near-infrared light, the light absorption of water does not become a disturbance. Thus, the visible light and entire near-infrared band can be used for the measurements.

Once the analysis model is created, when a perturbation is applied using the analysis model, one or more of the plurality of light sources 11 having the optimum wavelength is selected by the light source selection means 13, the optimum irradiation timing is set by the irradiation timing setting means 14, and the lighting control means 15 performs the lighting control so that one or more of the plurality of the light sources 11 having the optimum wavelength irradiate the target measurement object in the optimum irradiation order.

In addition, this analyzer can measure the spectrum while applying a perturbation that the wavelength, the irradiation order, and the number of irradiations of the irradiated light source are changed. Thus, the wavelength, the irradiation order, the number of irradiations, and the combinations thereof can be changed in various ways, and the optimum perturbation for changings of water and/or measurements of water can easily and quickly be found.

The irradiation unit 2 is not limited to the above configuration.

(1-2) Detection Unit

The detection unit 3 detects the reflected light, the transmitted light, or the transmitted-reflected light from the target measurement object irradiated with light having an entire or a part of the wavelength range from 400 nm to 2500 nm by the irradiation unit 2. Regarding the detected light, the raw absorbance spectral data for the incident light can be obtained for each wavelength.

Figure 5:
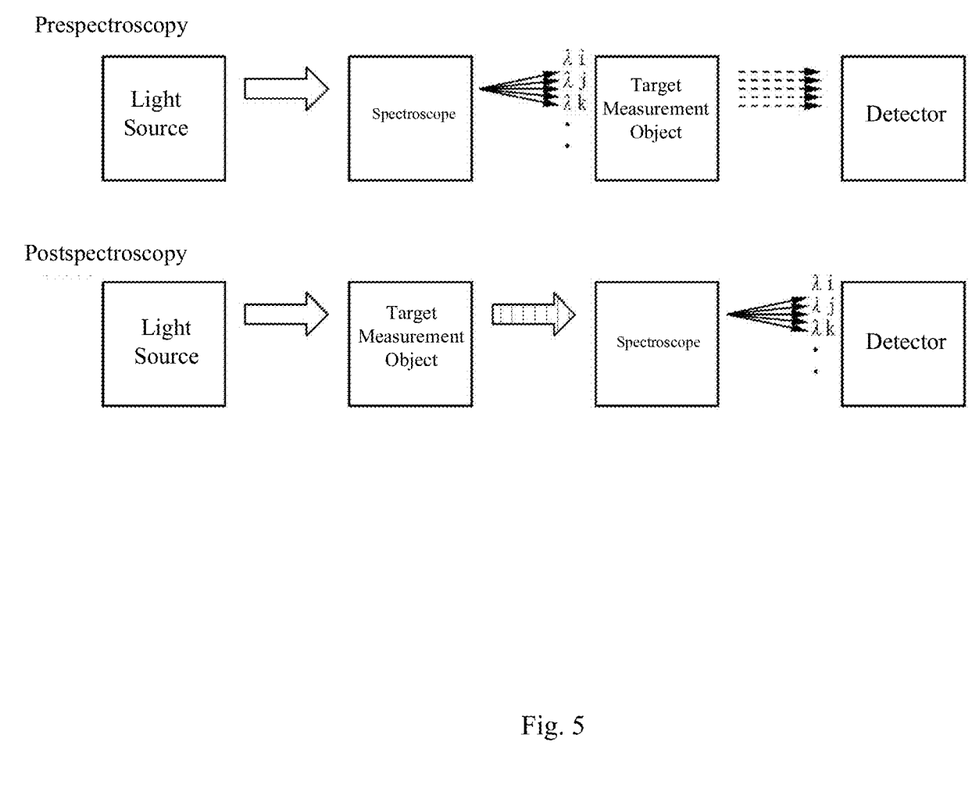
FIG. 5 is a diagram illustrating prespectroscopy and postspectroscopy.

There are two types of spectroscopic methods, the pre-spectroscopy and the post-spectroscopy (see FIG. 5). As described above, since each light source 2A of the irradiation unit 2 directly irradiates (projects) the target measurement object, a pre-spectroscopy that disperses the light before projecting the light onto the target measurement object might be adopted rather than the post-spectroscopy that detects and disperses the light from the target measurement object irradiated with the light.

Figure 6A:
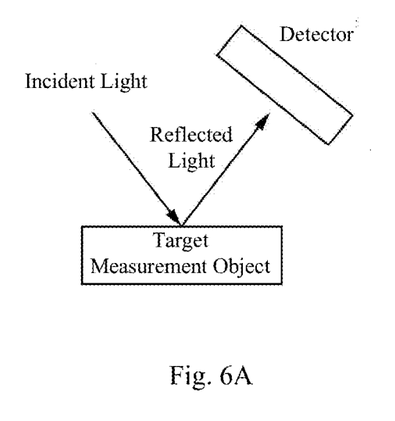
FIG. 6A is a diagram illustrating a detection methods of the reflected light detection that can be adopted in the above analyzer.
Figure 6B:
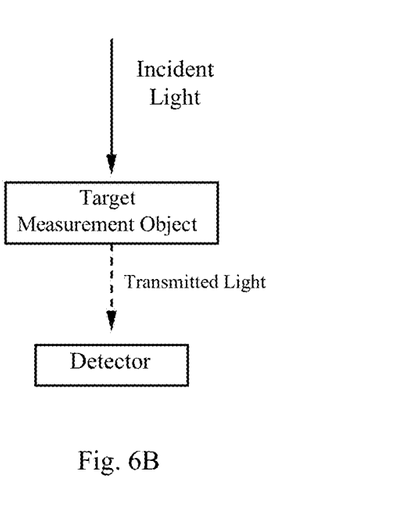
FIG. 6B is a diagram illustrating a detection method of the transmitted-reflected light detection that can be adopted in the above analyzer.
Figure 6C:
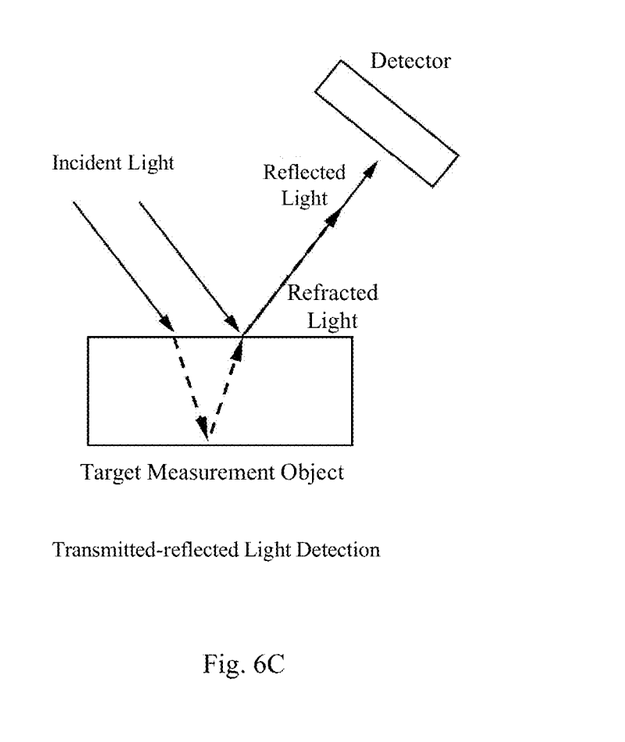
FIG. 6C is a diagram illustrating a detection method of the reflected light detection that can be adopted in the above analyzer.

There are three types of detection methods: the reflected light detection, the transmitted light detection, and the transmitted-reflected light detection. As shown in FIGS. 6A to 6C, in the reflected light detection and the transmitted light detection, the transmitted-reflected light from the target measurement object are respectively detected by the detector. The transmitted-reflected light detection detects an interfering light between the reflected light and the light radiated from the target measurement object, wherein the light radiated from the target measurement object is the refracted light that reflects inside the target measurement object and radiates again from the target measurement object where the incident light enters. The detection unit 3 of this analyzer may adopt any of these detection methods of the reflected light detection, the transmitted light detection and the transmitted reflected light detection.

The detector in the detection unit 3 can be configured by, for example, a CCD (Charge Coupled Device) which is a semiconductor element. The present invention is not limited to this, and other kinds of light receiving elements may be adopted. The spectroscope can also be configured by a known means.

(1-3) Data Analysis Unit

The absorbance for each wavelength, that is, absorbance spectral data can be obtained from the detection unit 3. The data analysis unit 4 may analyze by using an analysis model created in advance based on the absorbance spectral data.

Regarding the analysis model, a plurality of analysis models such as a quantitative model and a qualitative model can be prepared, and different ones can be used depending on whether the quantitative evaluation or the qualitative evaluation is performed. Further, regarding the analysis model, a plurality of types of models may be created so that the measurement using any one of the models can be performed by a single analyzer, or different analysis models may be created depending on the type of the target measurement object so that a plurality of types of measurements may be performed by a single analyzer.

The data analysis unit 4 can include a storage unit that stores various data such as spectral data, multivariate analysis programs, and analysis models, and an arithmetic processing unit that performs arithmetic processing based on these data and the programs. For example, the data analysis unit 4 can be realized by an IC (Integrated Circuit) chip or the like. Therefore, the data analysis unit 4 could easily be miniaturized to become portable. The above analysis models may also be written in the storage unit such as an IC chip.

Here, the raw absorbance spectral data may be used as it is for measurement/judgment by an analysis model. However, it is preferable to perform the data conversion process, such as a spectroscopic method or a multivariate analysis method which are able to decompose a peak in the obtained spectrum into element peaks, and perform measurement/judgment by the analysis model using the converted absorbance spectral data.

Examples of spectroscopic methods include second-order differential processing and Fourier transform, and examples of multivariate analysis methods include wavelet transformation and neural network method, but the method is not particularly limited.

(1-4) Result Display Unit

The result display unit 5 displays the analysis result by the data analysis unit 4. Specifically, the measured values obtained as a result of the analysis by the analysis model are displayed. Alternatively, in the case of a qualitative model, the necessary matters are displayed based on the class discrimination result. When the present analyzer is portable, it is preferable that the result display unit 5 is a flat display such as a liquid crystal display.

2. 2. Data Analysis Method (2-1) Preparation of Analysis Model

For example, this analyzer predicts the freshness of raw milk by analyzing the absorbance of specific wavelengths (or all measured wavelengths) in the absorbance spectral data obtained as described above with an analysis model. That is, it may be necessary that the analysis model is created in advance in order to make the final measurement.

The analysis model can be created by multivariate analysis. For example, the data matrix that stores the absorption spectrum of all wavelengths obtained by a spectral measurement is decomposed into scores and loadings by singular value decomposition, and the principal components that describe the freshness prediction in the sample are extracted (principal component analysis). This makes it possible to use independent components with less collinearity (=high correlation between explanatory variables) for multiple regression analysis. Then, the multiple regression analysis is applied wherein the explanatory variate is the score and wherein the target variate is the freshness prediction. This makes it possible to create an analysis model that predicts the freshness of raw milk from the absorption spectrum of all measured wavelengths or specific wavelengths.

These series of operations (multivariate analysis) have been established as principal component regression (PCR) or PLS (Partial Least Squares) regression (Yukihiro Ozaki, Akifumi Uda, and Toshio Akai, "Multivariate Analysis for Chemist-Introduction to Chemometrics," Kodansha, 2002). Other regression analysis methods include the CLS (Classical Least Squares) method and the cross-validation method.

The above methods are cases for creating a quantitative analysis model. In the cases for creating a qualitative analysis model, a multivariate analysis such as a principal component analysis (PCA) method for class discrimination and a SIMCA (Soft Independent Modeling of Class Analogy) method, a KNN (K Nearest Neighbors) method and others can be applied. The SIMCA method performs a principal component analysis for each of a plurality of groups (classes), and creates principal component models for each class.

Then, the unknown sample is compared with respect to the main component model of each class, and the unknown sample is assigned to the class of the most suitable main component model. Further, the class discrimination analysis such as the SIMCA method can be said to be a method of classifying the absorption spectrum or the regression vector into a class by pattern recognition.

An analysis model using multivariate analysis such as the SIMCA method or PLS method can be created by using self-made software or commercially available multivariate analysis software. In addition, by creating software specialized for the purpose of use, quick analysis becomes possible.

An analysis model built by using such a multivariate analysis software may be saved as a file, and this file may be called when analyzing unknown raw milk, and the raw milk of the target measurement object is quantitatively or qualitatively analyzed by using the analysis model. This enables simple and quick freshness prediction. As the analysis model, it is preferable to save a plurality of analysis models such as a quantitative model and a qualitative model as files, and appropriately update each model.

Once the analysis model is created, the wavelength light required for measurement for the analysis model is determined. The analyzer configuration can be further simplified by irradiating the sample with limited one or more wavelength ranges determined in this way.

In the spectrum measurement by this analyzer, it is preferable to apply a perturbation to the target measurement object by adding a predetermined condition. The data analysis so as to bring out the effect of this perturbation is preferable.

(2-2) Perturbation

"Perturbation" means inducing a change in the absorbance of a sample by setting multiple types and conditions for a certain condition to measure, and obtaining multiple spectral data that are different from each other. The conditions include concentration change (including concentration dilution), repeated irradiation of light, an extension of irradiation duration, addition of electromagnetic force, change of optical path length, temperature, pH pressure, electrical conductivity (EC), mechanical vibration, and other conditions which induce either physical or chemical changes, or a combination thereof. The present analyzer may apply a perturbation by irradiation with light.

For light irradiation, the number of irradiations and the irradiation duration can be changed, and the spectrum of the sample can be measured by applying a perturbation that optimizes these conditions. For example, the spectral data in which the absorbance of the sample slightly fluctuates (that is, changes) can be obtained by irradiating light of a predetermined wavelength three times continuously before measurement. By using these spectral data for multivariate analysis such as the SIMCA method and the PLS method, the analysis accuracy can be improved and a high-precision measurement can be performed.

It is conceivable that the change in the absorbance of the sample due to the perturbation is caused by the change (fluctuation) in the absorption of water molecules in the sample. That is, because of the irradiation repeatedly with light three times as a perturbation, it is conceivable that the response and absorption of water is slightly changed differently in each of the first, second, and third times, and as a result, the spectrum fluctuates.

In the example described later, each sample (raw milk) was quantitatively analyzed by performing a regression analysis by the PLS method using the absorbance spectral data obtained by such three times of repeated irradiation.

Further, when the light is repeatedly irradiated three times in this way, each sample is preferably classified by performing class discrimination by the SIMCA method using at least two times of the absorbance spectral data among the obtained three times absorbance spectral data, and can be analyzed with high accuracy. The number of times of the light irradiation is not particularly limited to three.

Example 1: Prediction of Freshness of Raw Milk (1)

Figure 7:
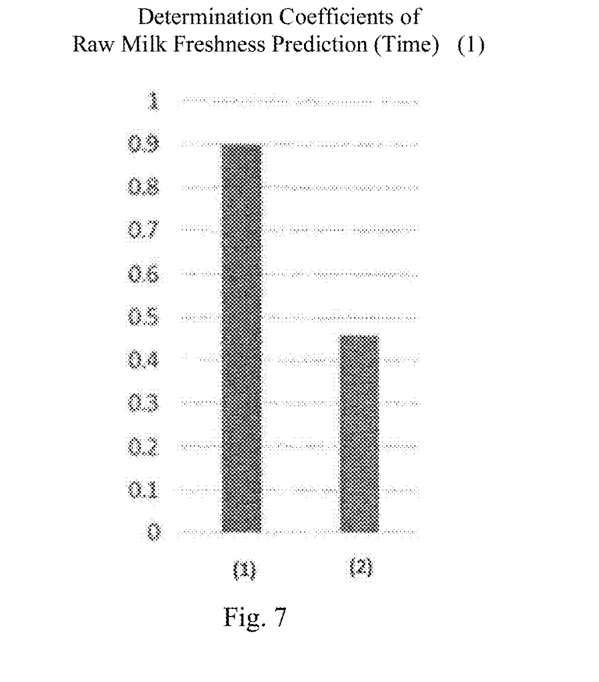
FIG. 7 is a diagram showing differences in the determination coefficients when the perturbation is changed.

In order to build a raw milk freshness prediction model for predicting the number of storage days of raw milk, the measurements for raw milk of 1 to 5 days elapse after milking as samples were performed using LEDs each of whose light sources have the following single wavelength.
Wavelengths of the LED light source (nm):
660 680 700 720 735 750 770 780
810 830 850 870 890 910 940 970
Measurement condition:
Measurement 1:
After irradiating light from 660 nm to 970 nm sequentially from the short wavelength side to the long wavelength side as a pre-irradiation, the measurement was performed by light from 660 nm to 970 nm was irradiated sequentially from the long wavelength side to the short wavelength side as a measurement-irradiation.
Measurement 2:
The measurement was performed by irradiating light from 660 nm to 970 nm sequentially from the long wavelength side to the short wavelength side without pre-irradiation.
Multivariate Analysis Algorithm: qualitative analysis
Result
As shown in FIG. 7, the determination coefficient of the measurement 1 with a perturbation (preliminary irradiation) that the irradiation with light was performed before the measurement was higher than that of the measurement 2 without perturbation. It is effective for the analyzer to be able to appropriately set the irradiation order of the measurement wavelength etc. in order to set the measurement conditions for obtaining the determination coefficient with higher accuracy.

Example 2: prediction of Freshness of Raw Milk (2)

Figure 8:
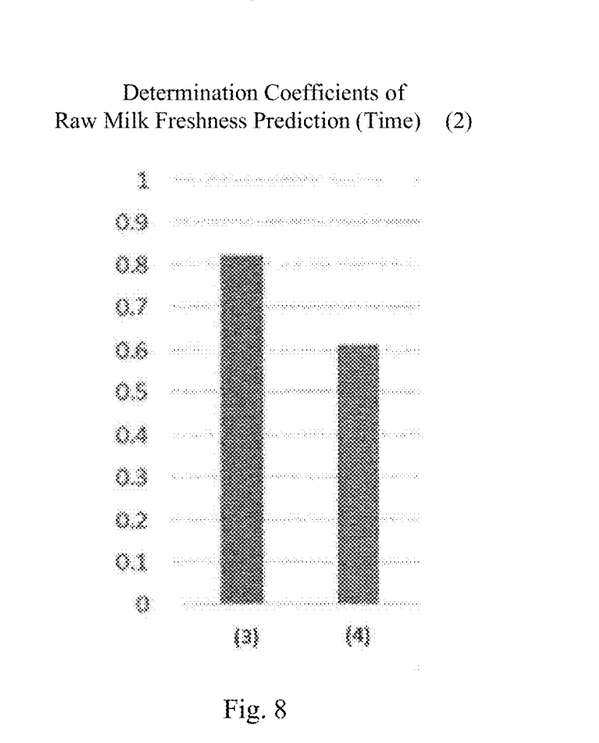
FIG. 8 is a diagram showing differences in the determination coefficients when the perturbation is changed.

In order to build a raw milk freshness prediction model for predicting the number of storage days of raw milk, the measurements for raw milk of 1 to 5 days after milking as samples were performed using LEDs each of whose light sources have the following single wavelength.
Wavelengths of the LED light source (nm):
660 680 700 720 735 750 770 780
810 830 850 870 890 910 940 970
Measurement condition:
Measurement 3:
After irradiating light from 660 nm to 970 nm sequentially from the long wavelength side to the short wavelength side as a pre-irradiation, the measurement was performed by light from 660 nm to 970 nm was irradiated sequentially from the short wavelength side to the long wavelength side as a measurement-irradiation.
Measurement 4:
The measurement was performed by irradiating light from 660 nm to 970 nm sequentially from the short wavelength side to the long wavelength side without pre-irradiation.
Multivariate Analysis Algorithm: qualitative analysis
As shown in FIG. 8, the determination coefficient of the measurement 3 with a perturbation that is preliminary irradiation before the measurement was higher than that of the measurement 4 without perturbation. It is effective for the analyzer to be able to appropriately set the irradiation order of the measurement wavelength etc. in order to set the measurement conditions for obtaining the determination coefficient with higher accuracy.

Example 3: Identification of Hot Spring Water

In order to build an identification model for various hot spring waters, the measurements for four types of hot spring water (hot spring water A to D) and ultrapure water as samples were performed using the analyzer including the following 16-wavelengths of single wavelength LEDs.
Wavelengths of the LED light source (nm)
660 680 700 720 735 750 770 780
810 830 850 870 890 910 940 970
Measurement Condition
Measurement A:
After irradiating light from 660 nm to 970 nm sequentially from the short wavelength side to the long wavelength side as a pre-irradiation, the measurement was performed by light from 660 nm to 970 nm was irradiated sequentially from the long wavelength side to the short wavelength side as a measurement-irradiation.
Measurement B:
After irradiating light from 660 nm to 970 nm sequentially from the long wavelength side to the short wavelength side as a pre-irradiation, the measurement was performed by light from 660 nm to 970 nm was irradiated sequentially from the short wavelength side to the long wavelength side as a measurement-irradiation.

Analysis Data

For both measurements A and B, the analyses were performed using both the measured values obtained by the irradiation sequentially from the short wavelength side to the long wavelength side and the measured values obtained by the irradiation sequentially from the long wavelength side to the short wavelength side.

Multivariate Analysis Algorithm: quantitative analysis

Result

Figure 9A:
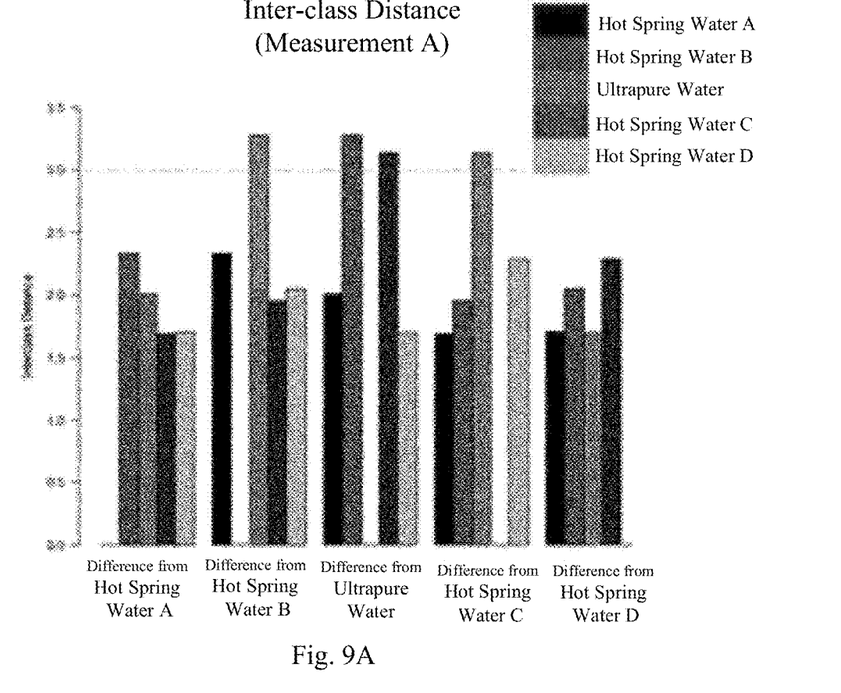
FIG. 9A is a diagram showing differences in the inter-class distances when the perturbation is changed.
Figure 9B:
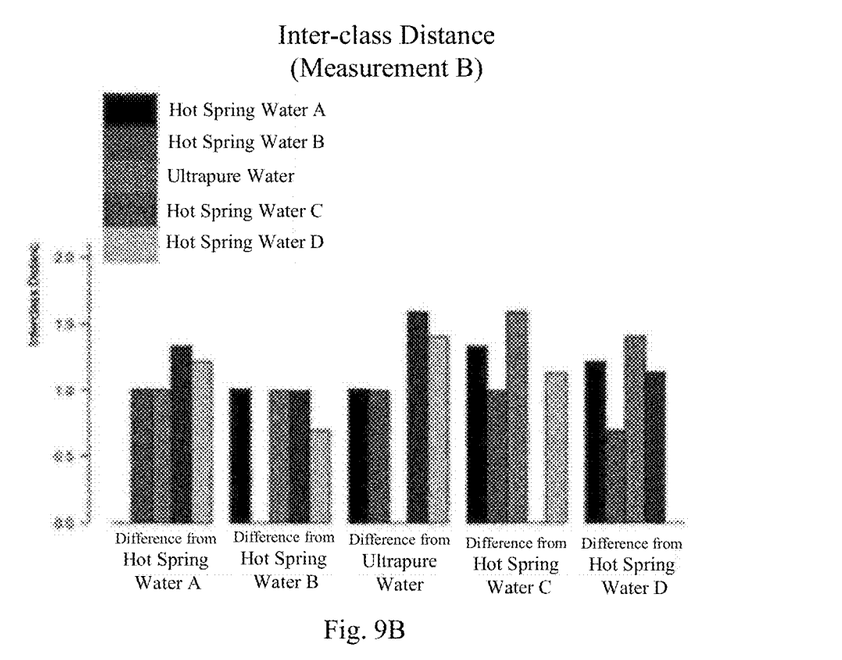
FIG. 9B is a diagram showing differences in the inter-class distances when the perturbation is changed.

As shown in FIGS. 9A and 9B, comparing the measurements A and B, the inter-class distance in the measurement A is larger than that in the measurement B among all the samples. It is conceivable that the irradiation order of the irradiation light for applying perturbation in the measurement A is more effective than that in the measurement B. Here, the inter-class distance is an index indicating the accuracy of discrimination between classes, and the larger the value, the higher the accuracy of discrimination.

Example 4: Prediction of Metal Ion Concentration in Hydroponic Nutrient Solution In order to build a model for predicting iron ion, magnesium ion and electrical conductivity in a hydroponic nutrient solution, the measurements were performed using this analyzer including the following 16-wavelengths of single wavelength LEDs.

Wavelengths of the LED light source (nm)
660 680 700 720 735 750 770 780
810 830 850 870 890 910 940 970

Measurement Condition

Measurement A:

After irradiating light from 660 nm to 970 nm sequentially from the short wavelength side to the long wavelength side as a pre-irradiation, the measurement was performed by light from 660 nm to 970 nm was irradiated sequentially from the long wavelength side to the short wavelength side as a measurement-irradiation.

Measurement B:

After irradiating light from 660 nm to 970 nm sequentially from the long wavelength side to the short wavelength side as a pre-irradiation, the measurement was performed by light from 660 nm to 970 nm was irradiated sequentially from the short wavelength side to the long wavelength side as a measurement-irradiation.

Analysis Data

For both measurements A and B, the analyses were performed using both the measured values obtained by the irradiation sequentially from the short wavelength side to the long wavelength side and the measured values obtained by the irradiation sequentially from the long wavelength side to the short wavelength side.

Multivariate Analysis Algorithm: quantitative analysis

Result

Figure 10:
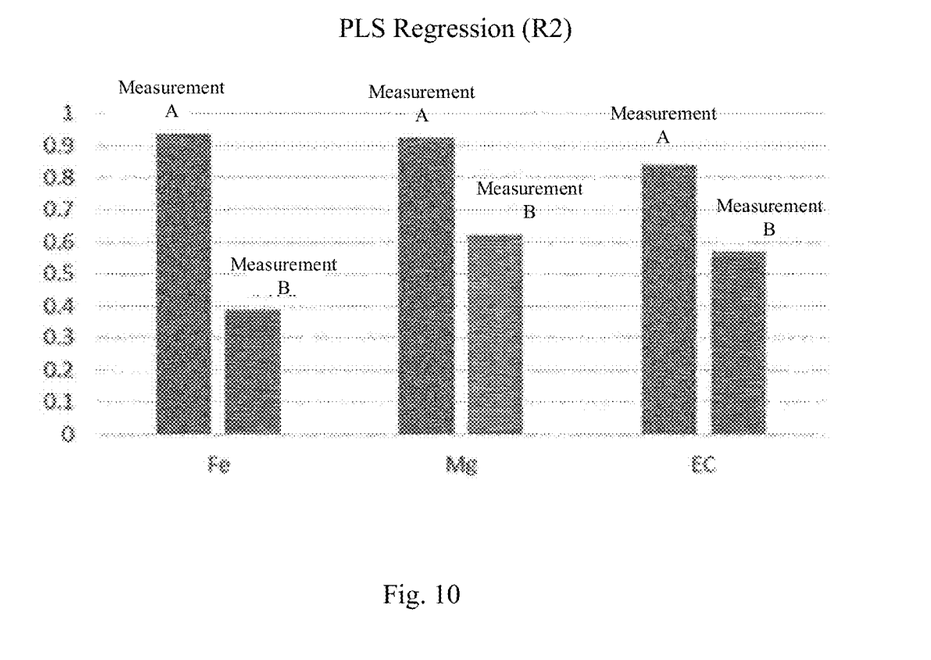
FIG. 10 is a diagram showing differences in the inter-class distances when the perturbation is changed.

As shown in FIG. 10, the PLS Regression (R2) of iron ion, magnesium ion and electrical conductivity (EC) in the measurement A is larger than that in the measurement B. It is conceivable that the irradiation order of the irradiation light for applying perturbation in the measurement A is more effective than that in the measurement B.

Example 5: Aging Degree Measurement

A wavelength light in the wavelength range of 680 to 970 nm is irradiated from the irradiation unit to a male subject (400 people before work) aged 20 to 70 years or a sample related to the male subject. After the reflected light, the transmitted light or transmitted-reflected light thereof is detected and the absorbance spectral data of water is obtained, the absorbances of all measured wavelengths or specific wavelengths in the absorbance spectral data were analyzed using the analysis model prepared in advance. The spectrum measurement was performed while applying a perturbation to the male subject or the sample related to the male subject by repeatedly irradiating with the light.

Figure 11A:
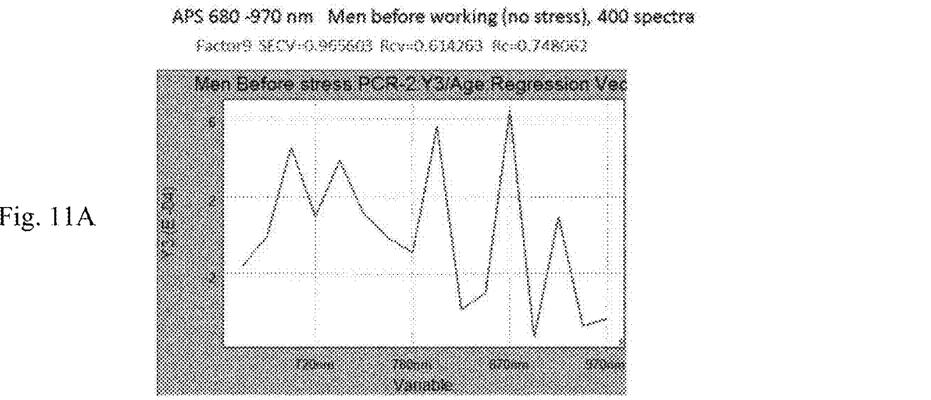
FIG. 11A a diagram showing all partial regression coefficients of the multiple regression equation based on the quantitative model.
Figure 11B:
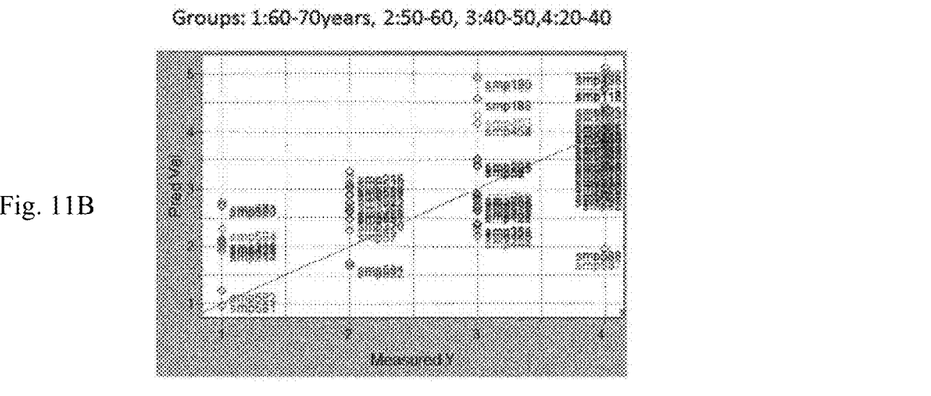
FIG. 11B is a diagram showing a relationship between actual measurement values (horizontal axis) and estimated values (vertical axis).
Figure 11C:
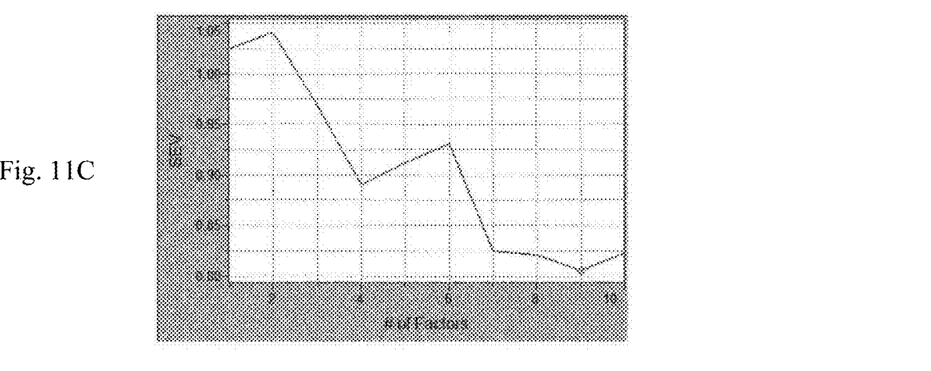
FIG. 11C is a diagram showing a relationship between numbers of main components (horizontal axis) and standard errors (vertical axis).

The male subjects aged 20 to 70 are grouped into four groups: 60 to 70 years (group 1), 50 to 60 years (group 2), 40 to 50 years (group 3) and 20 to 40 years (group 4). The analyses were performed separately, and the results are shown in FIGS. 11A, 11B and 11C. FIG. 11A shows all partial regression coefficients of the PLS regression equation created as a quantitative model. FIG. 11B shows the relationship between the measurement values (horizontal axis) and the estimated values (vertical axis). The horizontal axis shows the wavelength and the vertical axis shows the coefficient value. FIG. 11C shows the relationship between the number of principal components (horizontal axis) and the standard error (vertical axis). The wavelength range used is from 680 nm to 970 nm, and there are partial regression coefficients corresponding to each wavelength, which was determined using the PLS regression method.

As can be seen from the correlation coefficient (Rc) in FIG. 11A, high significance is shown. Even when cross-validation is performed, the correlation coefficient (Val) is a large value. Therefore, it can be said that the degree of aging can be measured.

SEVC represents the standard error of calibration, and SEV represents the standard error of cross-validation. Both represent the degree of deviation between the measured value and the estimated value. Factors represent the number of principal components used.

Example 6: Growth State of Microorganisms

Two types of microorganisms, Acidovorax and Pseudomonas, were bacteriostatically applied to commercially available mineral water (2 CFU/mL). The spectrometry and the viable bacteria count of the mineral water mixed with microorganisms were measured at 29° C. at each elapsed time. After that, a model was created using multivariate analysis (PLS) of time and the viable bacteria count, and spectral analyses at specific wavelengths were performed.

Figure 12:
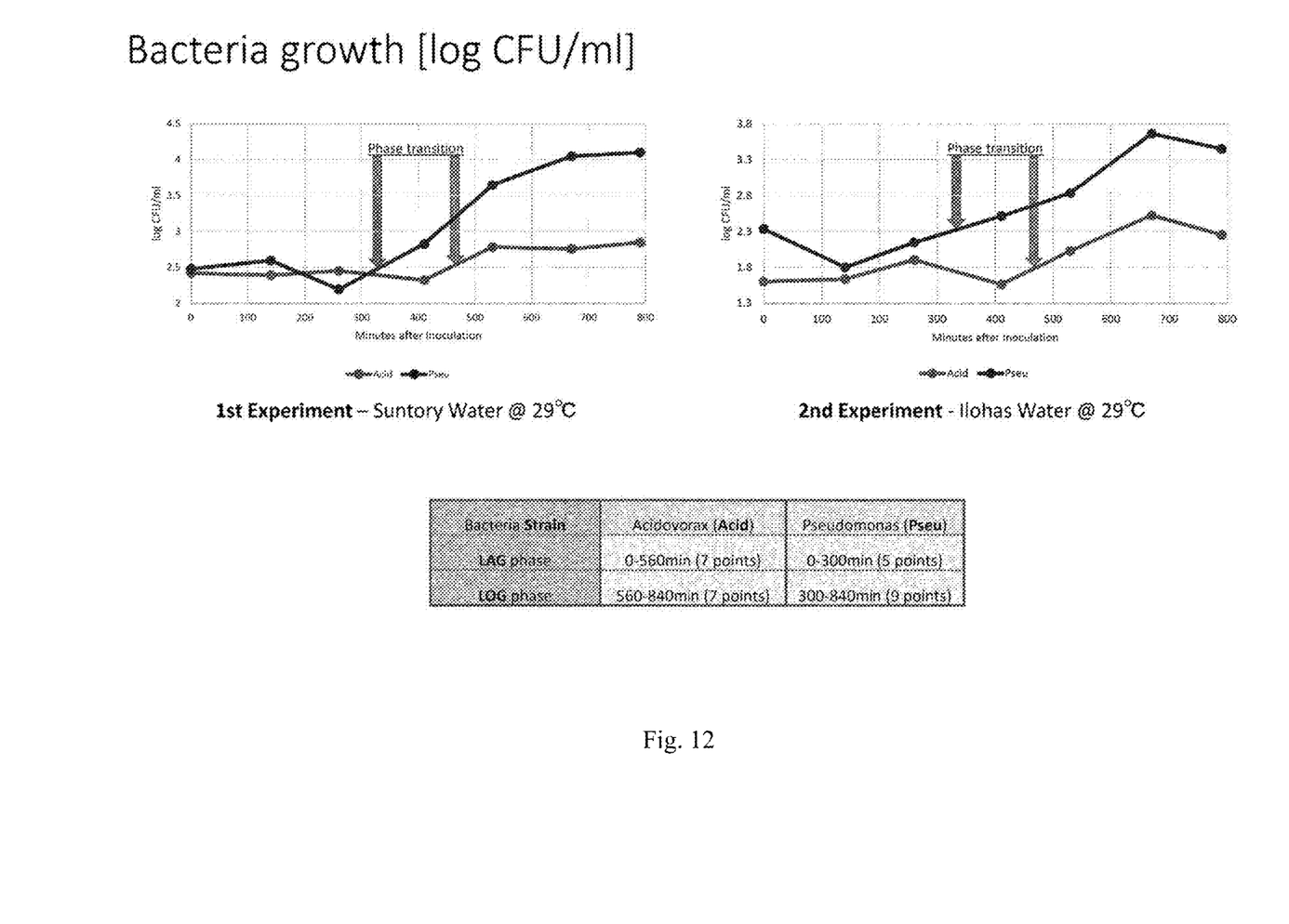
FIG. 12 is a diagram showing changes in the number of microorganisms relating to time passage.
Figure 13:
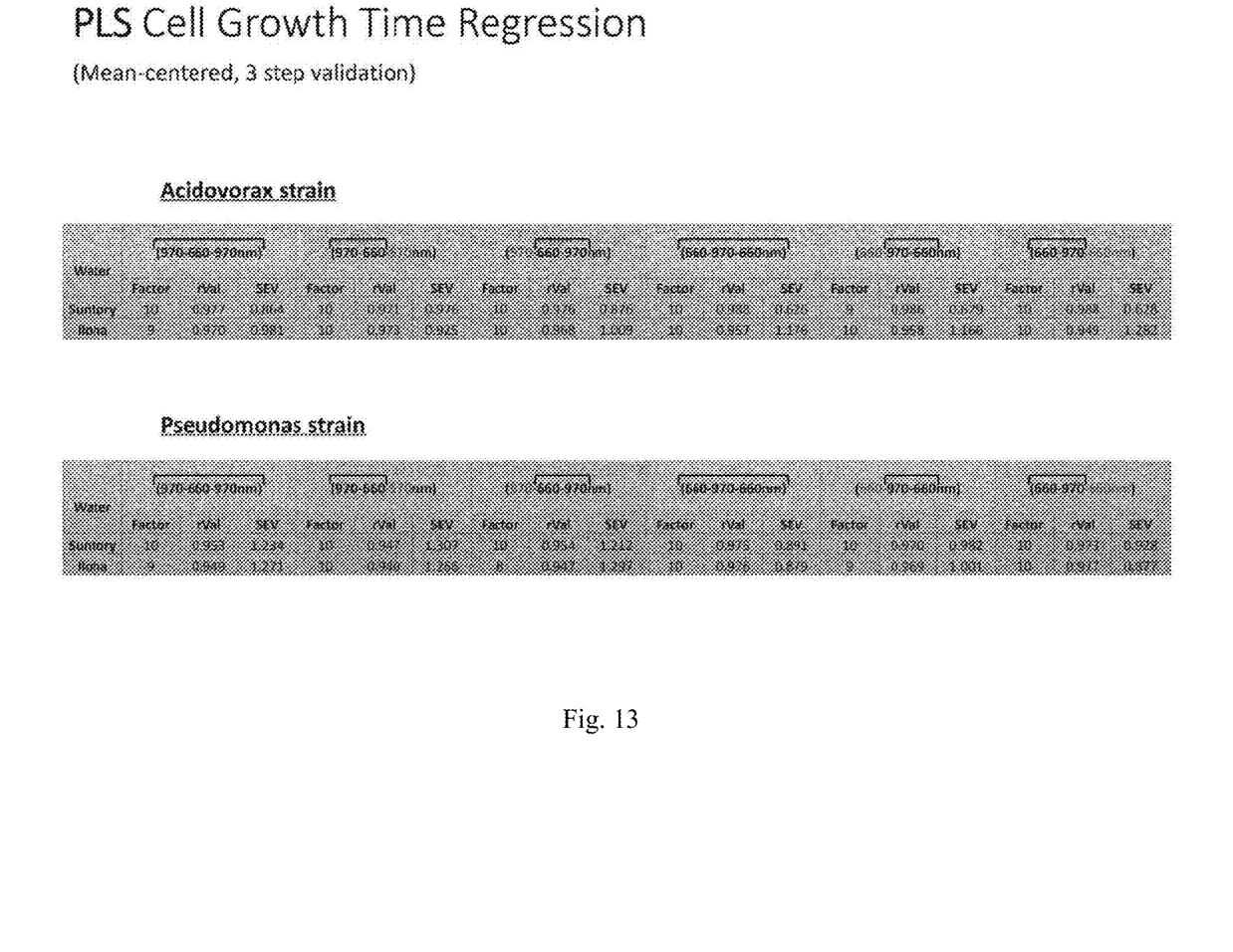
FIG. 13 is a diagram showing the correlation coefficients and the standard errors when the wavelength is changed.

The results are as shown in FIGS. 12 and 13. As shown in FIG. 12, it can be seen that the growth state changes from 300 to 500 minutes.

Further, as shown in FIG. 13, when the cross-validation, that the selected light irradiates sequentially from the short wavelength side to the long wavelength side after irradiating light sequentially from the long wavelength side to the short wavelength side, or irradiates sequentially from the long wavelength side to the short wavelength side after irradiating light sequentially from the short wavelength side to the long wavelength side, is performed by repeatedly, the correlation coefficient (Val) between the viable bacteria count and time is larger. Therefore, it can be said that the state of proliferation can be inferred.

Further, since the wavelength to be used can be easily changed by using this analyzer, the irradiation order of the wavelengths so that the correlation coefficient may be increased can be easily selected.

As described above, the preferred embodiment of the present invention has been described with reference to the drawings, but various additions, changes or deletions can be made without departing from the spirit of the present invention. Therefore, such things are also included within the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A spectroscopic analyzer comprising:
   an irradiator that irradiates a target measurement object with lights of a plurality of different wavelengths sequentially in a timed manner as a pre-irradiation, and, after the pre-irradiation, further irradiates the target measurement object with lights of a plurality of different wavelengths sequentially in a timed manner as a measurement-irradiation;
   a detector that, during the measurement-irradiation, detects reflected light, transmitted light, or a transmitted reflected light from the target measurement object at each of the plurality of different wavelengths of the measurement-irradiation and that outputs absorbance spectral data;
   a data analyzer that analyzes the absorbance spectral data;
   a result display that displays analysis results related to components of the target measurement object; and
   a lighting controller that controls the irradiator to irradiate lights of different wavelengths in a timed and sequential manner to the target measurement object;
   wherein the pre-irradiation is a perturbation which does not involve a measurement.

2. The spectroscopic analyzer according to claim 1, wherein the plurality of different wavelengths in the pre-irradiation and the plurality of different wavelengths in the measurement-irradiation are determined based on wavelengths that the analysis requires.

3. The spectroscopic analyzer according to claim 1, wherein the plurality of different wavelengths in the pre-irradiation and the plurality of different wavelengths in the measurement-irradiation are the same.

4. The spectroscopic analyzer according to claim 1, wherein
   the irradiator sequentially irradiates the plurality of different wavelengths in the measurement-irradiation from a short wavelength side to a long wavelength side when the plurality of different wavelengths in the pre-irradiation are sequentially irradiated from a long wavelength side to a short wavelength side, or
   the irradiator sequentially irradiates the plurality of different wavelengths in the measurement-irradiation from a long wavelength side to a short wavelength side when the plurality of different wavelengths in the pre-irradiation are sequentially irradiated from a short wavelength side to a long wavelength side.

5. The spectroscopic analyzer according to claim 1, wherein the plurality of different wavelengths in the pre-irradiation are sequentially irradiated from a short wavelength side to a long wavelength side.

6. The spectroscopic analyzer according to claim 1, wherein the plurality of different wavelengths in the pre-irradiation are sequentially irradiated from a long wavelength side to a short wavelength side.

7. The spectroscopic analyzer according to claim 1, wherein both the plurality of different wavelengths in the pre-irradiation and the plurality of different wavelengths in the measurement-irradiation are within a range between 660 nm and 970 nm, at specific water wavelength bands of light absorbed by water.

8. A spectroscopic method comprising:
   irradiating a target measurement object with lights of a plurality of different wavelengths sequentially in a timed manner as a pre-irradiation,
   further irradiating, after the pre-irradiation, the target measurement object with lights of a plurality of different wavelengths sequentially in a timed manner as a measurement-irradiation;
   detecting, during the measurement-irradiation, reflected light, transmitted light, or a transmitted reflected light from the target measurement object at each of the plurality of different wavelengths of the measurement-irradiation and outputting absorbance spectral data;
   analyzing the absorbance spectral data; and
   displaying analysis results related to components of the target measurement object;
   wherein the irradiating is controlled to sequentially irradiate lights of different wavelengths in a timed and sequential manner to the target measurement object; and
   the pre-irradiation is a perturbation which does not involve a measurement.

* * * * *